(12) United States Patent  
Cholas et al.

(10) Patent No.: US 9,014,540 B1
(45) Date of Patent: Apr. 21, 2015

(54) TECHNIQUES FOR PROVISIONING LOCAL MEDIA PLAYERS WITH CONTENT

(75) Inventors: Chris Cholas, Frederick, CO (US); Eric D. Hybertson, Broomfield, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 268 days.

(21) Appl. No.: 13/551,422

(22) Filed: Jul. 17, 2012

(51) Int. Cl.
*H04N 9/80* (2006.01)
*H04N 21/258* (2011.01)

(52) U.S. Cl.
CPC .................................. *H04N 21/258* (2013.01)

(58) Field of Classification Search
CPC ............ G06F 11/1453; G06F 11/1451; G06F 17/30156; H04M 11/007
USPC .................... 386/248, 240, 260, 250
See application file for complete search history.

(56) References Cited

U.S. PATENT DOCUMENTS

| | | | |
|---|---|---|---|
| 8,312,489 B2 * | 11/2012 | Nakamura et al. ............... | 725/53 |
| 8,615,161 B2 * | 12/2013 | Corry et al. .................... | 386/250 |
| 2003/0056217 A1 | 3/2003 | Brooks | |
| 2007/0168541 A1 * | 7/2007 | Gupta et al. ................... | 709/231 |
| 2009/0228738 A1 * | 9/2009 | Michaelson et al. .............. | 714/4 |
| 2009/0304357 A1 * | 12/2009 | Rashkovskiy et al. ........... | 386/95 |
| 2011/0138018 A1 * | 6/2011 | Raveendran et al. .......... | 709/219 |
| 2012/0089578 A1 * | 4/2012 | Lam .............................. | 707/692 |
| 2012/0150949 A1 * | 6/2012 | Vijayan Retnamma et al. .............................. | 709/203 |
| 2014/0095439 A1 * | 4/2014 | Ram .............................. | 707/640 |

* cited by examiner

*Primary Examiner* — Helen Shibru
(74) *Attorney, Agent, or Firm* — Otterstedt, Ellenbogen & Kammer, LLP

(57) ABSTRACT

A local media player in network communication with a remote storage system stores a portion of content. It then compares the portion of content stored on the local media player with content stored on the remote storage system to determine if the portion of content is duplicated on the remote storage system. If so, the portion of content stored on the local media player is replaced with a pointer to a duplicate portion of content stored on the remote storage system. The portion of content is played back by the local media player at least in part by receiving the duplicate portion of content from the remote storage system if the portion of content has been replaced by a pointer, or by accessing the portion of content stored on the local media player if the portion of content has not been replaced by a pointer.

27 Claims, 11 Drawing Sheets

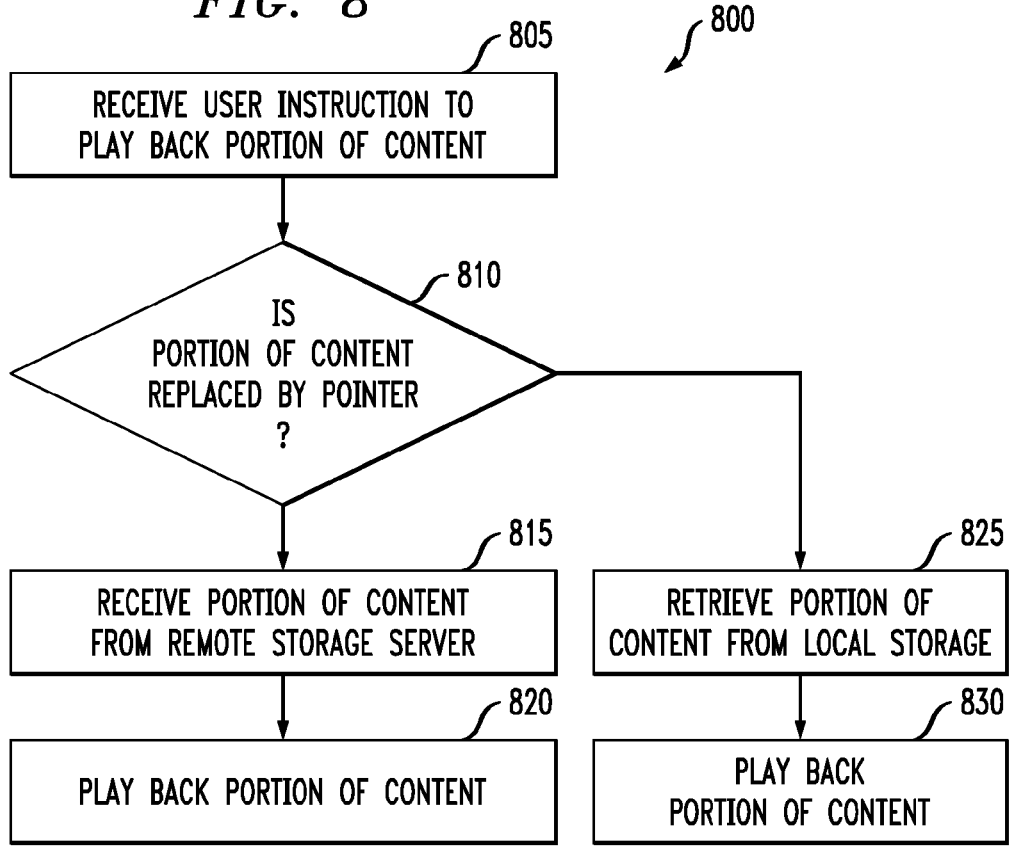
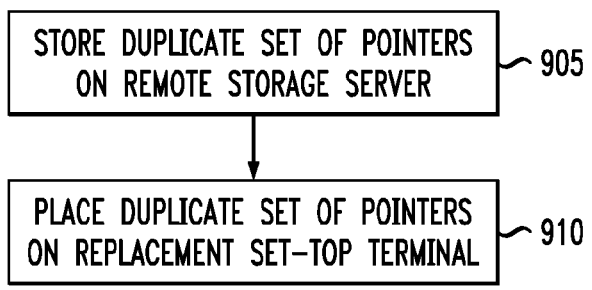

TECHNIQUES FOR PROVISIONING LOCAL MEDIA PLAYERS WITH CONTENT

FIELD OF THE INVENTION

The present invention relates generally to the electrical, electronic, and computer arts, and more particularly relates to local media players such as digital video recorders and the like.

BACKGROUND OF THE INVENTION

Use of digital video recorders (DVRs), also known as personal video recorders (PVRs), is ubiquitous. Such devices may provide several benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions furnished by the DVR.

SUMMARY OF THE INVENTION

In accordance with an aspect of the invention, a local media player in network communication with a remote storage system stores a portion of content on the local media player. The local media player then compares the portion of content stored on the local media player with content stored on the remote storage system to determine if the portion of content is duplicated on the remote storage system. If the portion of content is duplicated on the remote storage system, the portion of content stored on the local media player is replaced with a pointer to a duplicate portion of content stored on the remote storage system. The portion of content is played back by the local media player at least in part by receiving the duplicate portion of content from the remote storage system if the portion of content has been replaced by a pointer, or by accessing the portion of content stored on the local media player if the portion of content has not been replaced by a pointer.

In accordance with another aspect of the invention, a computer program product comprises a tangible computer readable storage medium having computer readable program code embodied therewith. The computer readable program code is configured to store a portion of content on a local media player. The computer readable program code is also configured to compare the portion of content stored on the local media player with content stored on a remote storage system to determine if the portion of content is duplicated on the remote storage system. If the portion of content is duplicated on the remote storage system, the computer readable program code is configured to replace the portion of content stored on the local media player with a pointer to a duplicate portion of content stored on the remote storage system. The computer readable program code is configured to play back the portion of content at least in part by receiving the duplicate portion of content from the remote storage system if the portion of content has been replaced by a pointer, or by accessing the portion of content stored on the local media player if the portion of content has not been replaced by a pointer.

In accordance with yet another aspect of the invention, a local media player in network communication with a remote storage system comprises a memory and at least one processor coupled to the memory. The at least one processor is operative to store a portion of content on the local media player. The at least one processor is also operative to compare the portion of content stored on the local media player with content stored on the remote storage system to determine if the portion of content is duplicated on the remote storage system. If the portion of content is duplicated on the remote storage system, the at least one processor is operative to replace the portion of content stored on the local media player with a pointer to a duplicate portion of content stored on the remote storage system. The at least one processor is operative to play back the portion of content at least in part by receiving the duplicate portion of content from the remote storage system if the portion of content has been replaced by a pointer, or by accessing the portion of content stored on the local media player if the portion of content has not been replaced by a pointer.

In accordance with yet another aspect of the invention, a local media player in network communication with a remote storage system comprises means for storing a portion of content on the local media player, as well as means for comparing the portion of content stored on the local media player with content stored on the remote storage system to determine if the portion of content is duplicated on the remote storage system. In addition, the local media player comprises means for replacing the portion of content stored on the local media player with a pointer to a duplicate portion of content stored on the remote storage system if the portion of content is duplicated on the remote storage system. Lastly, the local media player comprises means for playing back the portion of content at least in part by receiving the duplicate portion of content from the remote storage system if the portion of content has been replaced by a pointer, or by accessing the portion of content stored on the local media player if the portion of content has not been replaced by a pointer.

In accordance with yet another aspect of the invention, a system comprises a local media player in network communication with a remote storage system. The local media player is operative to store a portion of content on the local media player. The local media player is also operative to compare the portion of content stored on the local media player with content stored on the remote storage system to determine if the portion of content is duplicated on the remote storage system. If the portion of content is duplicated on the remote storage system, the local media player is operative to replace the portion of content stored on the local media player with a pointer to a duplicate portion of content stored on the remote storage system. The local media player is operative to play back the portion of content at least in part by receiving the duplicate portion of content from the remote storage system if the portion of content has been replaced by a pointer, or by accessing the portion of content stored on the local media player if the portion of content has not been replaced by a pointer.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code for performing the method steps indicated. Furthermore, one or more embodiments of the invention or elements thereof can be implemented in the form of an apparatus including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

These and other features and advantages of the invention will become apparent from the following detailed description of illustrative embodiments thereof, which is to be read in connection with the accompanying drawings.

BRIEF DESCRIPTION OF THE DRAWINGS

FIG. 8 shows a flow diagram of an exemplary method for performing content playback on a set-top terminal in the FIG. 1 HFC network;

FIG. 9 shows a flow diagram of an exemplary method for performing pointer placement on a replacement set-top terminal in the FIG. 1 HFC network;

DETAILED DESCRIPTION OF PREFERRED EMBODIMENTS

Figure 1:
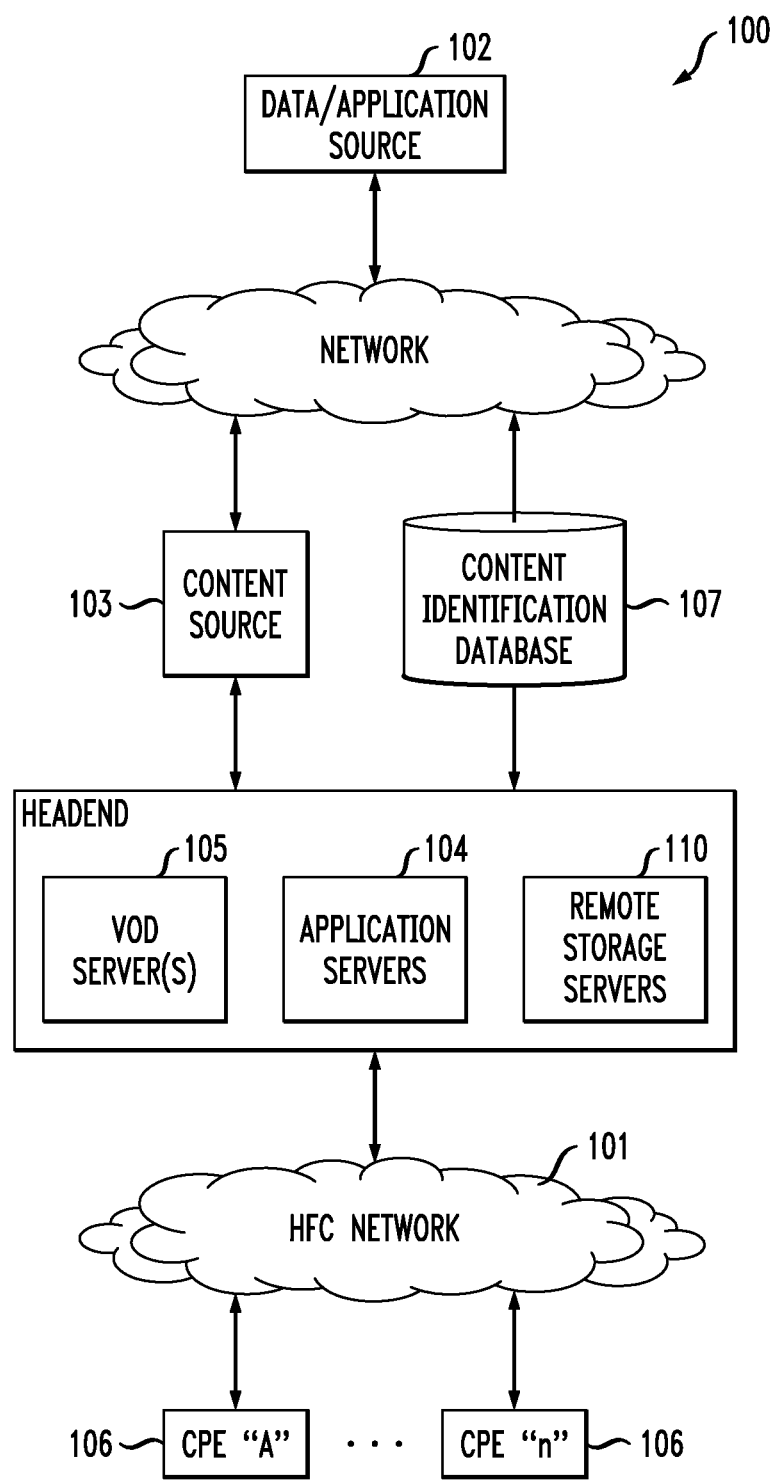
FIG. 1 shows a block diagram of at least a portion of an exemplary hybrid fiber-coaxial (HFC) network configuration in accordance with an illustrative embodiment of the invention.

FIG. 1 illustrates a typical content-based network configuration 100. The various components of the network 100 include: (i) one or more data and application origination points 102; (ii) one or more content sources 103, (iii) one or more application distribution servers 104; (iv) one or more video-on-demand (VOD) servers 105, (v) consumer (or customer) premises equipment (CPE) 106; (vi) one or more content identification databases 107; and (vii) one or more remote storage servers 110. The distribution server(s) 104, VOD servers 105, CPE(s) 106, and remote storage servers 110 are connected via a bearer (e.g., hybrid fiber cable (HFC)) network 101. A simple architecture is shown in FIG. 1 for illustrative brevity, although it will be recognized that comparable architectures with multiple origination points, distribution servers, VOD servers, content identification databases, remote storage servers, and/or CPE devices (as well as different network topologies) may be utilized consistent with the invention. For example, the headend architecture of FIG. 1a (described in greater detail below) may be used.

It should be noted at this point that in addition to a conventional HFC network or a switched digital network to be discussed below, other kinds of video content networks can be employed for network 101 (e.g., fiber-to-the-home (FTTH) or fiber-to-the-curb (FTTC)).

The data/application origination point 102 comprises any medium that allows data and/or applications (such as a VOD-based or "Watch TV" application) to be transferred to a distribution server 104 (for example, over a suitable network, not separately numbered). This can include, for example, a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill.

The application distribution server 104 comprises a computer system where such applications can enter the network system. Distribution servers per se are well known in the networking arts.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the customers' premises (or other appropriate locations) that can be accessed by a distribution server 104; for example, set-top terminal (STT), digital set-top box (DSTB), set-top box (STB), or simply "box," and the like.

Figure 1A:
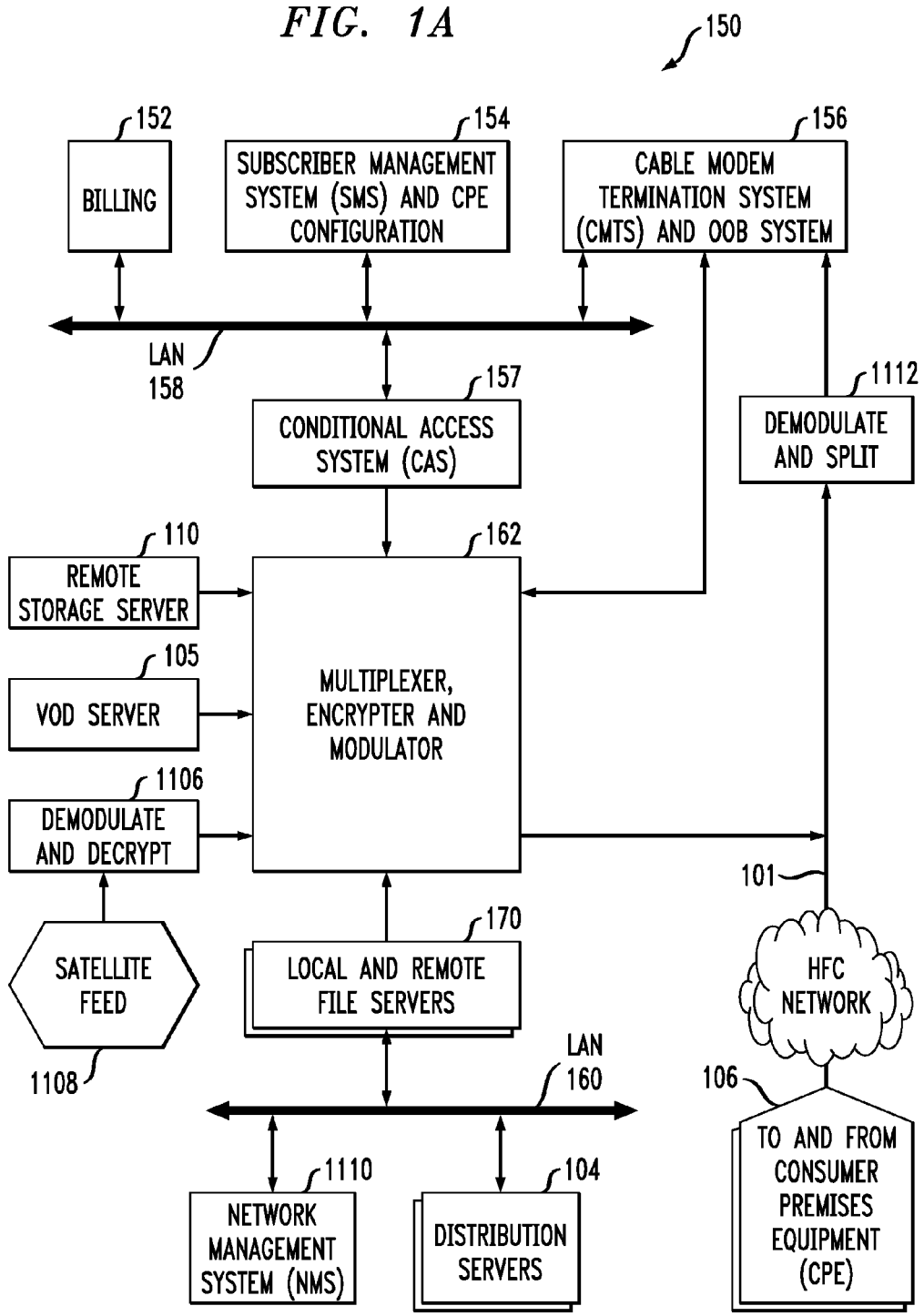
FIG. 1a shows a block diagram of at least a portion of an exemplary HFC cable network headend configuration for use with the FIG. 1 HFC network.

Referring now to FIG. 1a, one exemplary embodiment of a headend architecture is described. As shown in FIG. 1a, the headend architecture 150 comprises typical headend components and services including billing module 152, subscriber management system (SMS) and CPE configuration management module 154, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 1a is high-level, conceptual architecture and that each multi-service operator or multiple system operator (MSO) may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the headend should be adapted to acquire the information for the carried channels from various sources. Typically, the channels being delivered from the headend 150 to the CPE 106 ("downstream") are multiplexed together in the headend and sent to neighborhood hubs (see FIG. 1b) via a variety of interposed network components.

Content (e.g., audio, video, etc.) is provided in each downstream (in-band) channel associated with the relevant service group. To communicate with the headend or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols. The OpenCable™ Application Platform (OCAP) 1.0, 2.0, 3.0 (and subsequent) specification (Cable Television Laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Figure 1B:
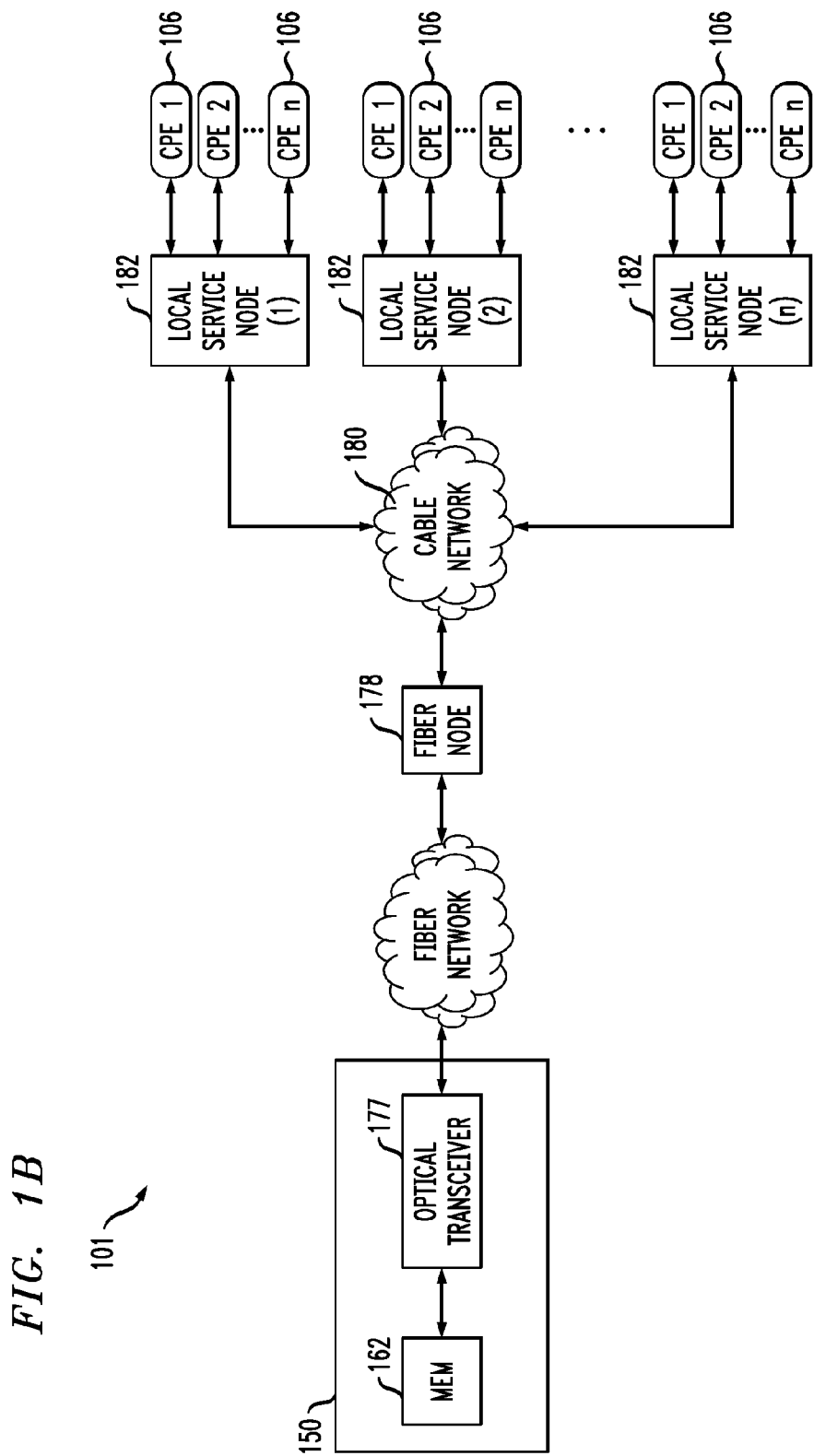
FIG. 1b shows a block diagram of at least a portion of an exemplary local service node configuration for use with the FIG. 1 HFC network.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend 150 or further downstream). The optical domain signals are then distributed to a fiber node 178, which further distributes the signals over a distribution network 180 to a plurality of local servicing nodes 182. This provides an effective 1:N expansion of the network at the local service end.

Figure 1C:
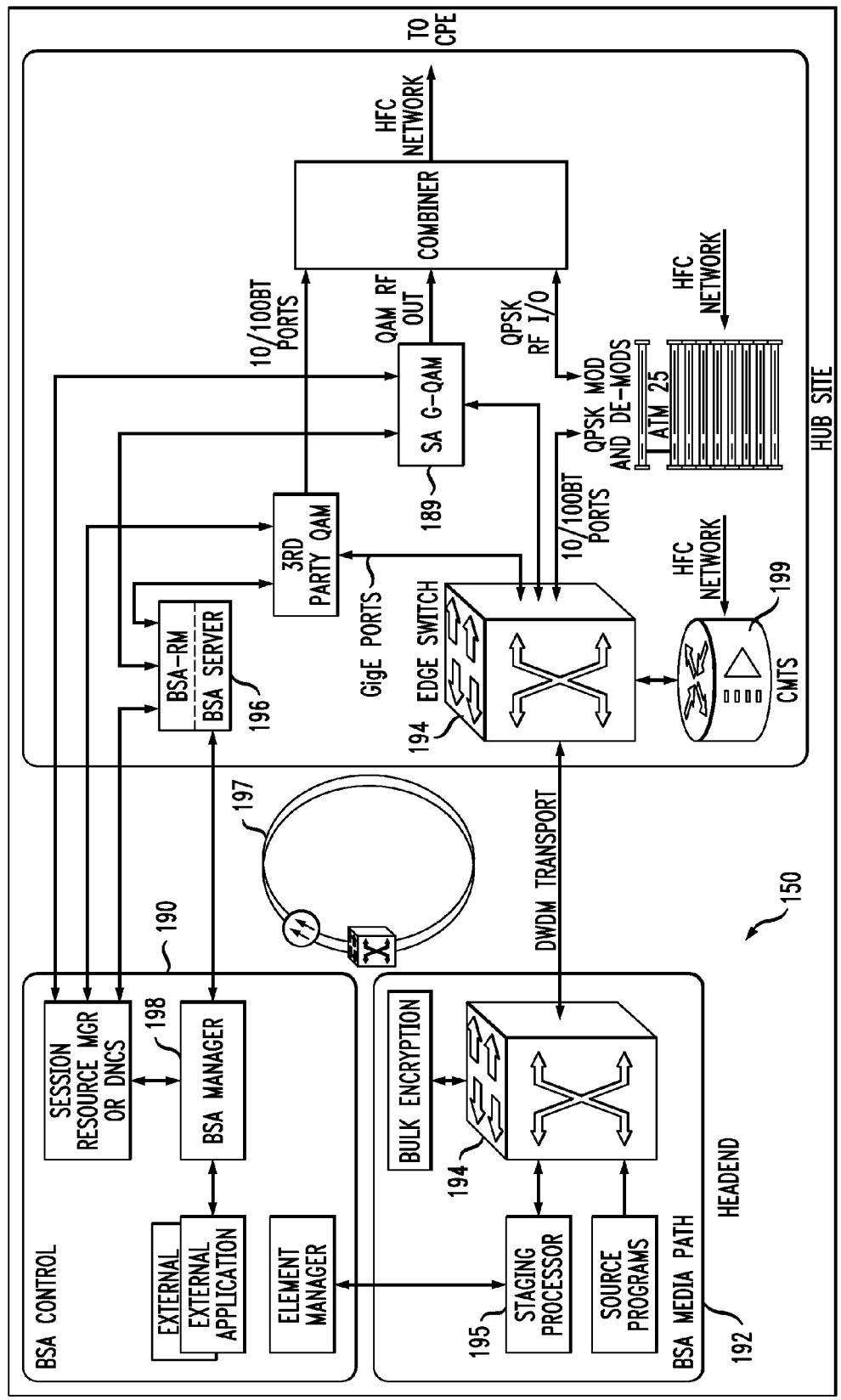
FIG. 1c shows a block diagram of at least a portion of an exemplary broadcast switched architecture (BSA) network for use with the FIG. 1 HFC network.

FIG. 1c illustrates an exemplary "switched" network architecture also useful with one or more embodiments of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows implementation details of one exemplary embodiment of this broadcast switched network architecture. Specifically, the headend 150 contains switched broadcast control and media path functions 190, 192 (the latter including staging processor 195); these elements cooperate to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

US Patent Publication No. 2003/0056217 of Paul D. Brooks, entitled "Technique for Effectively Providing Program Material in a Cable Television System," the complete disclosure of which is expressly incorporated herein by reference for all purposes, describes one exemplary broadcast switched digital architecture useful with one or more embodiments of the present invention, although it will be recognized by those of ordinary skill that other approaches and architectures may be substituted. In a cable television system in accordance with the Brooks invention, program materials are made available to subscribers in a neighborhood on an as needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood.

In addition to "broadcast" content (e.g., video programming), the systems of FIGS. 1a-1c may also deliver Internet data services using the Internet protocol (IP), although other protocols and transport mechanisms of the type well known in the digital communication art may be substituted. One exemplary delivery paradigm comprises delivering MPEG-based video content, with the video transported to user personal computers (PCs) (or IP-based set-top boxes (STBs)) over DOCSIS channels comprising MPEG (or other video codec such as H.264 or AVC) over IP over MPEG. That is, the higher layer MPEG or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream quadrature amplitude modulation (QAM) channels (QAMs) to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. Also, in other embodiments, CMTS 199 could be located in a place other than the hub site.

The edge switch 194 forwards the packets received from the CMTS 199 to the QAM modulator 189, which transmits the packets on one or more physical (QAM-modulated RF) channels to the CPEs 106. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while some descriptions presented herein are described in the context of Internet services that include multicast and unicast data, there is potential applicability to other types of services that include multicast transmission of data delivered over a network having multiple physical channels or even virtual or logical channels. For example, switching between various physical channels that comprise a virtual channel, can itself be conducted according to the "switched" approach. As a simple illustration, if a first virtual channel is comprised of physical channels (e.g., QAMs) A, B and D, and a second virtual channel is comprised of QAMs C, E and F, a cable modem (CM) or other CPE can be configured to switch between the A/B/D and C/E/F virtual channels as if they were a single QAM.

The configurations shown in FIGS. 1a-1c are exemplary in nature and different approaches may be used in other embodiments; such other approaches may have more or less functionality (for example, high speed Internet data services might be omitted in some cases).

Figure 2:
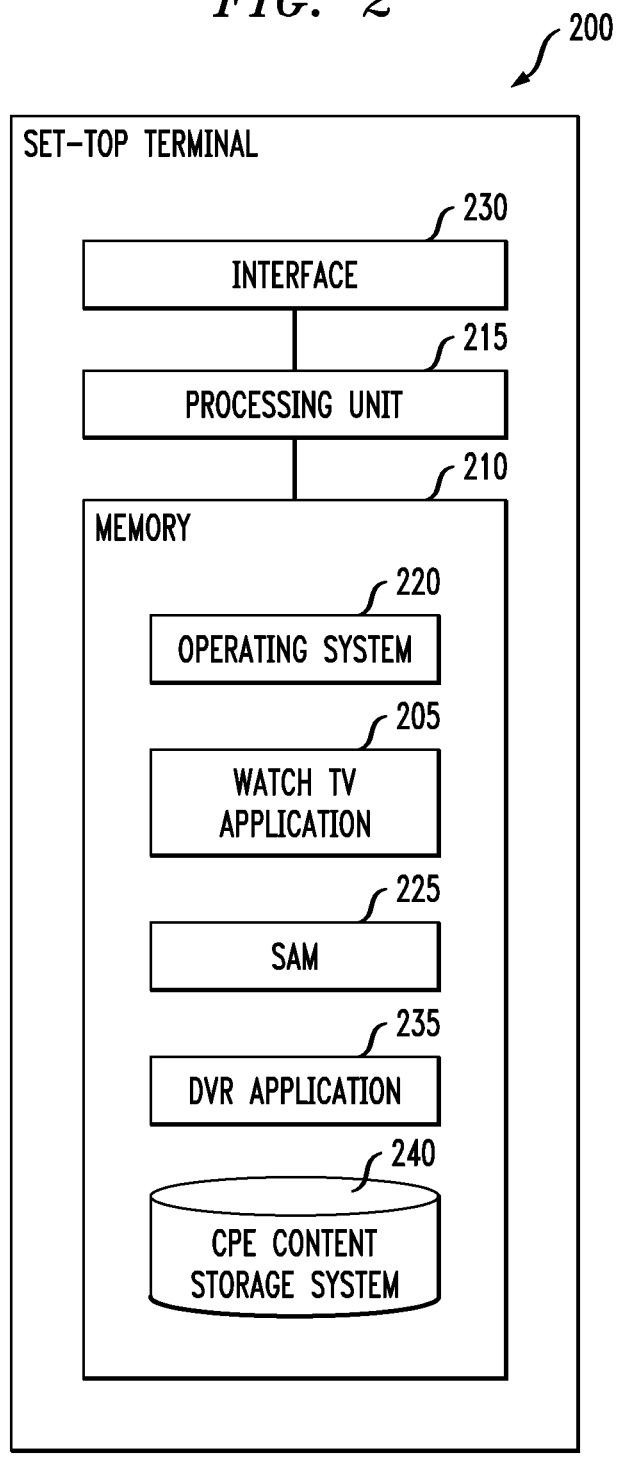
FIG. 2 shows a block diagram of at least a portion of an exemplary set-top terminal for use with the FIG. 1 HFC network.

FIG. 2 shows a block diagram of at least some elements of an exemplary set-top terminal 200, which is one form of a CPE 106. A conventional "Watch TV" application 205 is installed in the set-top terminal 200 to service those program channels (or programs) afforded the traditional broadcast service. The Watch TV application 205, residing in a memory 210, provides such well known functions as channel navigation control, channel selection in response to a channel change event, etc. A channel change event occurs when a user at the set-top terminal 200 issues a command to change from one program channel to another. Such a command may be issued, say, using a remote control (not shown), which signal is receptive by the set-top terminal 200. The memory 210 in this instance comprises one or more caches, disks, hard drives, non-volatile random access memories (NVRAMs), dynamic random access memories (DRAMs), read-only memories (ROMs), and/or Flash ROMs.

For example, in the memory 210, NVRAM may be used for storage of a user's settings and set-top terminal configuration settings, such as parental control codes, favorite channel line-ups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to the set-top terminal 200 from the headend 150 after the set-top terminal 200 has been deployed at the user's premises.

A processing unit 215 orchestrates the operations of the set-top terminal 200. It executes instructions stored in the memory 210 under the control of an operating system 220. A service application manager (SAM) 225 is also stored in memory 210 and may form part of the operating system 220. The SAM 225 is responsible for, among other things, monitoring channel change events; administering channel, service and other tables in the set-top terminal 200; and maintaining a registry of applications in the set-top terminal 200. One such application is the aforementioned Watch TV application 205 which is invoked to service a traditional broadcast channel (or program). An interface 230 allows receipt of in-band and out-of-band material from the headend 150, as well as sending communications to the headend 150 via a reverse data channel (for example, of the kind(s) discussed above).

The interface 230 may include an RF front end (including demodulator and decryption unit) for interface with the network, as well as a plurality of different types of interfaces (e.g., video/audio interfaces, IEEE-1394 "Firewire", USB, serial/parallel ports, etc.) for interface with other end-user apparatus such as televisions, personal electronics, computers, WiFi/PAN or other network hubs/routers, etc. Other components which may be utilized within the set-top terminal 200 include RF tuner stages, buffer memory (which may be implemented in RAM or otherwise), various processing layers (e.g., DOCSIS MAC or DAVIC OOB channel, MPEG, etc.) as well as media processors and other specialized system-on-chip (SoC) or application-specific integrated circuit (ASIC) devices. These additional components and functionality are, in and of themselves, well known to those of ordinary skill in the cable and embedded system fields, and accordingly are not described further herein.

The set-top terminal 200 may also be provided with an OCAP-compliant monitor application and Java-based middleware which, inter alia, manages the operation of the set-top terminal 200 and applications running thereon. It will be recognized by those of ordinary skill that myriad different device and software architectures may be used consistent with the invention.

The set-top terminal 200 also provides digital video recorder (DVR) functionality. To this end, the memory 210 further includes a DVR application 235 and a CPE content storage system 240 for storing content locally on the set-top terminal 200. While, in the embodiment shown in FIG. 2, the set-top terminal 200 provides DVR functionality, in other instances, separate set-top terminals are associated with separate DVRs.

In accordance with an aspect of the invention, DVR functionality is implemented utilizing the DVR application 235 in the set-top terminal 200 in combination with the remote storage server 110 (more generally, a remote storage system) in the headend 150. The DVR application 235 records a portion of content, which is stored on the CPE content storage system 240. It then compares that portion of content with content stored on the remote storage server 110 to determine if the portion of content is duplicated thereon. If the portion of content is duplicated on the remote storage server 110, the portion of content stored on the CPE content storage system 240 is replaced by a pointer to the duplicate portion of content stored on the remote storage server 110. If, instead, the portion of content is not duplicated on the remote storage server 110, the portion of content is allowed to remain stored on the CPE content storage server 240. Ultimately, playback of the portion of content by the DVR application 235 occurs in one of two ways. If the portion of content originally stored on the set-top terminal 200 has been replaced by a pointer, the set-top terminal 200 plays back the portion of content by receiving the duplicate portion of content from the remote storage server 110. Under these circumstances, the DVR content may thereby be played back in a manner similar to the manner in which VOD content is played back. If, instead, the portion of content still remains on the set-top terminal 200 (i.e., it was not replaced by a pointer), then playback is performed by accessing the portion of content on the set-top terminal 200 in a manner more like a conventional DVR. That is, the DVR application 235 accesses its local storage (i.e., the CPE content storage system 240) when playing back the recorded content. In either case, the content is delivered to the user such that the user can exercise rewind, pause, skip and/or fast-forward functions.

Figure 3:
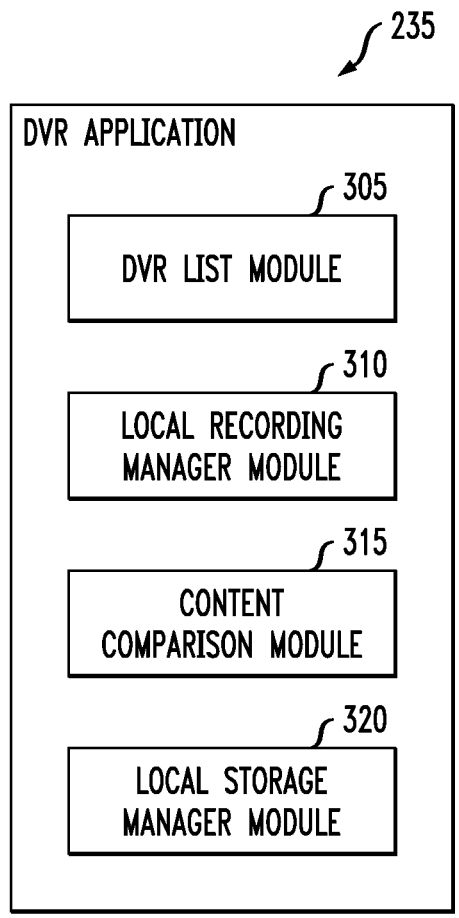
FIG. 3 shows a block diagram of at least a portion of an exemplary DVR application for use with the FIG. 1 HFC network.

Aspects of both the DVR application 235 and the remote storage server 110 act to facilitate this novel functionality. Additional aspects of the DVR application 235, in accordance with an illustrative embodiment of the invention, are detailed in the block diagram shown in FIG. 3. The DVR application 235 comprises a DVR list module 305, a local recording manager module 310, a content comparison module 315, and a local storage manager module 320. The DVR list module 305 is operative to provide a user with the ability to issue commands to the DVR application 235. The local recording manager module 310, in turn, is operative to respond to user commands to play back content. The content comparison module 315 is operative to compare the content that has been stored on the set-top terminal 200 with content stored remotely on the remote storage server 110. Lastly, the local storage manager module 320 is operative to store content on the CPE content storage system 240, and to further delete that stored content and replace it by pointers, as appropriate.

Figure 4:
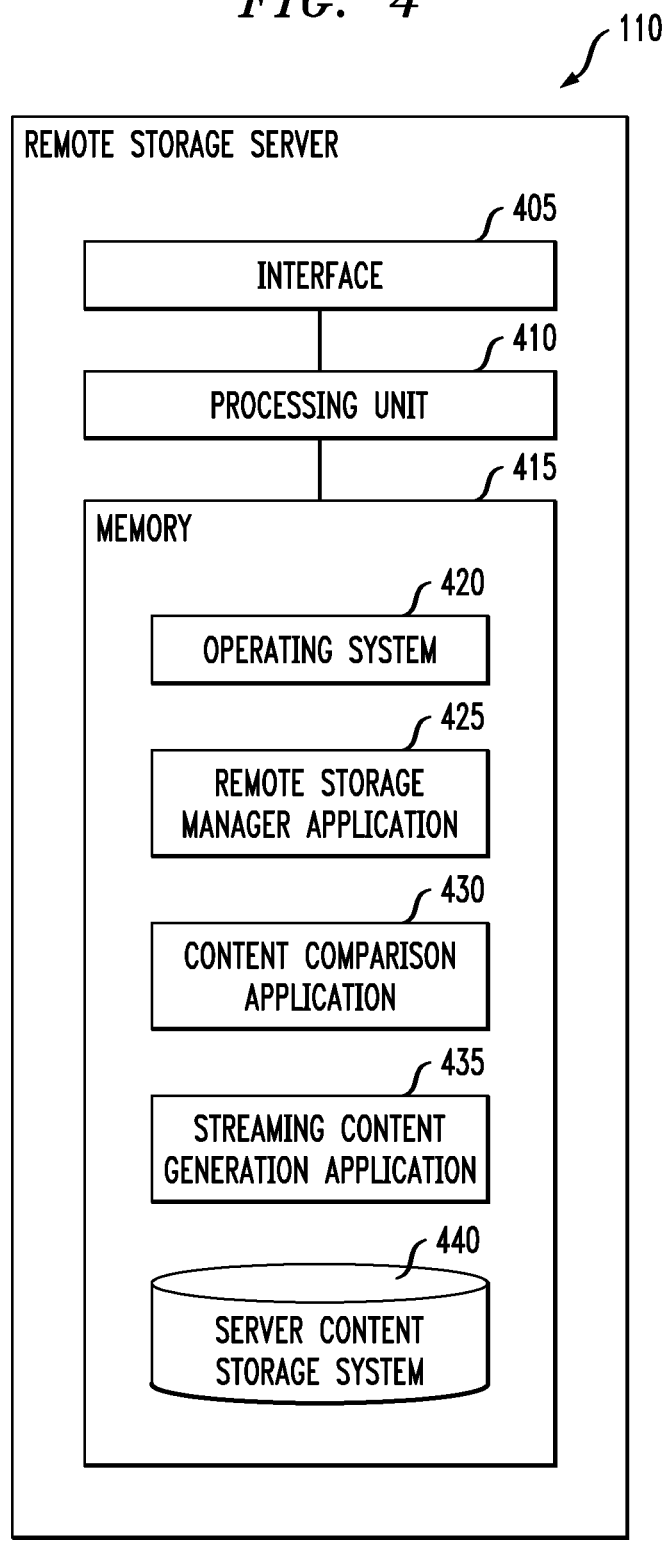
FIG. 4 shows a block diagram of at least a portion of an exemplary remote storage server for use with the FIG. 1 HFC network.

Complementary aspects of the remote storage server 110, also in accordance with an illustrative embodiment of the invention, are shown in FIG. 4. Here, the remote storage server 110 comprises an interface 405, a processing unit 410, and a memory 415. The processing unit 410 orchestrates the operations of the remote storage server 110. As at least part of its function, for example, it executes instructions stored in the memory 415 under the control of an operating system 420. The interface 405 allows the remote storage server 110 to communicate with the remainder of the headend 150 (see, for example, FIG. 1a). As was the case for the set-top terminal 200, the memory 415 of the remote storage server 110 may comprise one or more caches, disks, hard drives, NVRAMs, DRAMs, ROMs, and/or Flash ROMs.

In addition to the operating system 420, the memory 415 includes a remote storage manager application 425, a content comparison application 430, a streaming content generation application 435, as well as a server content storage system 440. The remote storage manager application 425 is operative to determine what content is stored on the server content storage system 440. The content comparison application 430, in turn, is operative to compare the content stored on the server content storage system 440 with the content stored locally on CPEs 106, such as the set-top terminal 200. Finally, the streaming content generation application 435 allows content stored on the server content storage system 440 to be transmitted to CPEs 106. In this respect, the streaming content generation application 435 allows, under appropriate circumstances, the remote storage server 110 to provide streaming content in a manner similar to a VOD server like the VOD server 105. In fact, in one or more alternative embodiments of the invention, the streaming content generation application 435 and the server content storage system 440 may be incorporated into the VOD server 105 (FIG. 1a) rather than duplicated in the remote storage server 110.

Figure 5:
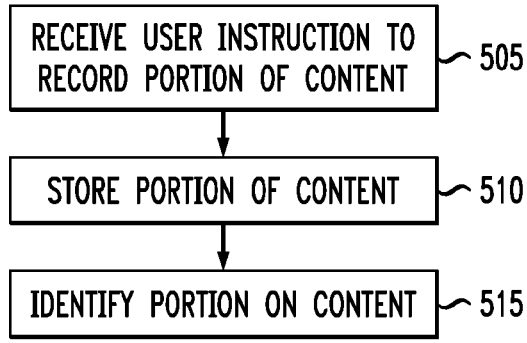
FIG. 5 shows a flow diagram of an exemplary method for performing content storage on a set-top terminal in the FIG. 1 HFC network.

Both the DVR application 235 (through the set-top terminal 200) and the remote storage server 110 are thereby operative to store content. FIG. 5 shows an exemplary method 500 by which this process may occur in the set-top terminal 200. In step 505, the DVR application 235 receives instructions from a user to record a portion of content. The portion of content may include, for example, a portion of video content, audio content, image content, text content, and the like. A particular portion of content may therefore comprise, as just a few examples, the whole or some fraction of a movie, television show, video, song, or image. In one or more embodiments of the invention, the DVR list module 305 may, for example, present the user with an interface (e.g., menu, list, etc.) for selecting one or more portions of content to be recorded. In interacting with this interface, a particular portion of content may be selected by the user specifying the channel on which the program is airing and its starting and ending times. Alternatively or additionally, the selection of the portion of content may be facilitated by providing the user with an interactive electronic program guide (IPG) that specifies upcoming content that is available for receipt by that user. Such IPGs and their implementation on a set-top terminal like the set-top terminal 200 will be familiar to one of ordinary skill in the art.

Once selected in this manner, the local storage manager module 320 of the DVR application 235 acts to cause the portion of content to be stored on the CPE content storage system 240 as the content is received by the set-top terminal 200, as indicated by step 510 in FIG. 5. In this manner, the DVR application 235 largely acts in conformity with conventional DVRs. Concurrently or subsequently, in step 515, the portion of content is identified by the content comparison module 315. The identity of the portion of content is then preferably associated with the now stored portion of content in some manner. The identity of the content may, for example, be placed on a list or table that describes each portion of content stored on the CPE content storage system 240 and its respective storage address thereon. Alternatively or additionally, the identity of each portion of content may be appended to the data forming the portion of content as a file name and/or metadata.

Figure 6:
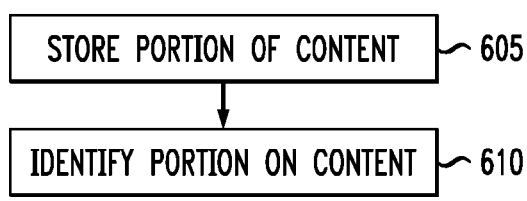
FIG. 6 shows a flow diagram of an exemplary method for performing content storage on a remote storage server in the FIG. 1 HFC network.

In accordance with aspects of the invention, the remote storage server 110 is also receiving and storing content in a similar manner, although such functions are not performed under the control of a user per se in the manner of the set-top terminal 200. FIG. 6 shows a flow diagram of a process 600 for storing a portion of content on the server content storage system 440 in accordance with an illustrative embodiment of the invention. In step 605, a portion of content is received by the remote storage server 110 and stored on server content storage system 440 under control of the remote storage manager application 425. In one or more embodiments of the invention, the remote storage server 110 may act to record all content that is transmitted by the headend 150 to the CPEs 106. Alternatively, the remote storage server 110 may act to selectively record only content that has certain attributes. The remote storage server 110 may, for example, only act to record content that is deemed to be of enough popularity among subscribers to warrant its storage on the headend 150. Alternatively or additionally, the remote storage manager application 425 may also act to determine if a received portion of content is already stored on the server content storage system 440 and forego storage of content already stored thereon with a purpose of reducing redundancy.

At the same time as, or subsequent to, step 605 of FIG. 6, the recorded portion of content is identified by the content comparison application 430, as indicated by step 610. The identity may then be associated with the data by listing, or by appending a file name and/or metadata in a manner similar to that described above for the DVR application 235.

Figure 7:
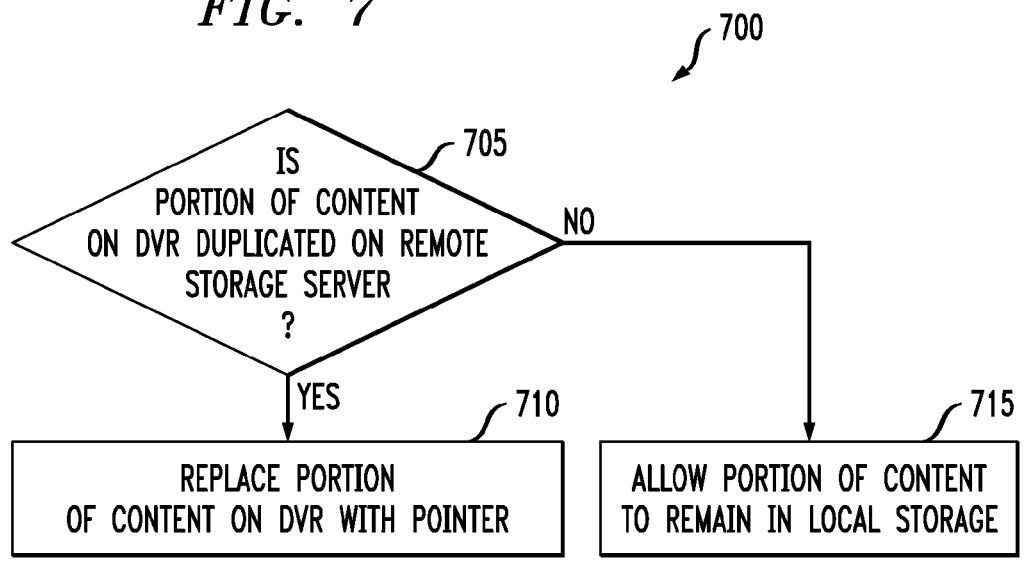
FIG. 7 shows a flow diagram of an exemplary method for performing pointer placement on a set-top terminal in the FIG. 1 HFC network.

As described above, once a portion of content is stored on the CPE content storage system 240, the DVR application 235 manages both long-term storage and playback of that portion of content in cooperation with the remote storage server 110. FIG. 7 describes a method 700, in accordance with an illustrative embodiment of the invention, for managing long term storage. In step 705, a portion of content stored on the set-top terminal 200 is compared with content stored on the remote storage server 110 to determine if the portion of content is duplicated thereon. Such a comparison is facilitated by the identification processes that have occurred in both the set-top terminal 200 and the remote storage server 110 (step 515 in FIG. 5, and step 610 in FIG. 6). If duplication is found, the process proceeds to step 710, wherein the portion of content stored on the set-top terminal 200 (on the CPE content storage system 240) is replaced by a pointer to the duplicate portion of content stored on the remote storage server 110 (on the server content storage system 440). Alternatively, where no duplication is found, the process instead advances to step 715, wherein the portion of content is allowed to remain in local storage on the set-top terminal 200.

The method 700 described in FIG. 7 may be initiated at regular time intervals and/or in response to various triggering events. These process steps may, for example, be initiated every certain number of days (e.g., once every seven days). Alternatively or additionally, the steps of the method 700 may be initiated every time the set-top terminal 200 records a predetermined number of portions of content, or records a predetermined quantity of data. In an illustrative embodiment, the precise manner in which these processes are ultimately initiated may be user selectable via, for example, a configuration menu provided by the DVR list module 305 of the DVR application 235.

Once the methods 500, 600, and 700 of FIGS. 5-7 are run a multiplicity of times, the CPE content storage system 240 in the set-top terminal 200 may contain both locally stored portions of content as well as pointers to duplicate portions of content on the remote storage server 110. As described above, playback of a particular portion of content by the DVR application 235 may then occur in one of two ways, which are detailed in FIG. 8. FIG. 8 shows a flow diagram of an exemplary method 800 for DVR playback, in accordance with an illustrative embodiment of the invention. Initially, at step 805, instructions are received from a user to play back a portion of content. Here, the DVR list module 305 may again present the user with an interface (e.g., menu, list, etc.), this one for selecting one or more portions of content to be played back. Subsequently, step 810 determines if the portion of content has been previously replaced by a pointer. If the result of step 810 is affirmative (i.e., the portion of content has been replaced by a pointer), the process moves on to step 815. In step 815, the local recording manager module 310 signals the streaming generation content application 435 of the remote storage server 110 to stream the duplicate portion of content from the server content storage system 440. This stream is ultimately played back for the user by means of the local recording manager module 310 of the DVR application 235, as indicated in step 820. Again, playback in this manner is similar to the presentation of on-demand content by a VOD server such as the VOD server 105. If, on the other hand, step 810 produces a negative result (i.e., the portion of content remains in local storage), the local recording manager module 310 in step 825 simply accesses that portion of content on the CPE content storage system 240. The content is then played back in step 830.

In one or more embodiments of the invention, the local recording manager module 310 in step 815 may signal the streaming content generation application 435 to begin streaming the duplicated portion of content to the DVR application 235 by manipulating the respective pointer. The pointer may be formatted so that it may be utilized as a parameter in one or more subroutines called by the local recording manager module 310. Alternatively or additionally, the pointer may be a command formatted in conformity with the Hypertext Transfer Protocol that both identifies the duplicate portion of content on the remote storage server 110 and commands the remote storage server 110 to return that portion of content. The pointer may, for example, be formatted as a uniform resource locator (URL).

Reference back to FIGS. 6 and 7 indicates that both the method 500 executed on the set-top terminal 200 and the method 600 executed on the remote storage server 110 comprise steps involving the identification of content (i.e., steps 515 and 610, respectively). Such identification steps may be accomplished in numerous ways, many of which will be familiar to one skilled in the art. Identification of a particular portion of content, may, in one or more embodiments, be performed by reference to the channel from which the portion of content was received in combination with the time period during which the portion of content was received. With channel and time known for a particular portion of content, that portion of content may be identified by reference to a listing schedule such as that provided by Tribune Media Services (TMS) (Orlando, Fla.) as well as several other providers. Available listing schedules may include, for example, the scheduled times and channels for currently airing and upcoming content. In one or more embodiments of the invention, a listing schedule may be periodically downloaded from a provider into the content identification database 107 shown in FIG. 1. Here, it becomes available to both the remote storage server 110 and the set-top terminal 200. Alternatively, rather than capturing a copy of the listing schedule in the content identification database 107, an external listing service provider may be accessed directly by way of a wide area network such as the Internet.

Such identifying data may, for example, already be included as part of a program's metadata. Program specific information such as "TMS Unique IDs" in a program's metadata may, for instance, identify the channel on which the program aired, the time of the program, as well as the network affiliate from which the program originated.

While methods 500 and 600 in FIGS. 5 and 6 utilize identifying steps 515 and 610, respectively, for purposes of facilitating the comparison step 705 in the method 700, one or more alternative embodiments of the invention may forego such identifying steps. As an alternative way of performing the comparing step 705 without identifying steps 515 and 610, for example, data stored on the remote storage server 110 may be surveyed on a bit-by-bit basis to see if it contains content that duplicates the portion of content stored on the set-top terminal 200. Because of the potential need to survey a large amount of data, such a comparison method may be aided by several well-known methodologies for eliminating redundancy in data (i.e., data "deduplication" techniques).

Replacing at least some of the content stored on a set-top terminal with pointers to duplicate content on a remote content server in accordance with aspects of the invention may provide several advantages. A typical movie may, for example, comprise some 20-30 Gigabytes (GB) of data. Because of this large file size, the ability of a set-top terminal, even one with a relatively large storage capacity, to record content is restricted. A pointer such as that described herein, in comparison, may comprise only a few bytes of data. Accordingly, aspects of the invention may act to substantially free up storage space on a digital video recorder for the recording of additional content.

What is more, aspects of the invention may be beneficial when a set-top terminal with DVR capabilities is replaced as part of an upgrade or in response to a malfunction. FIG. 9 shows an exemplary method 900 for implementing such functionality in accordance with an illustrative embodiment of the invention. In step 905, the remote storage server 110 stores a duplicate set of pointers on the server content storage system 440 that duplicates the set of pointers stored on the set-top terminal 200. Step 905 may be implemented via, for example, the remote storage manager application 425. In one or more embodiments of the invention, such a step may be initiated every time step 710 in method 700 is performed. Alternatively or additionally, step 905 may be triggered after the passage of a predetermined amount of time (e.g., every seven days) or upon the occurrence of a predetermined event (e.g., after five new pointers are stored on the set-top terminal 200) as part of a regular pointer "backup" routine.

Subsequently, when the original set-top terminal 200 is replaced by a replacement set-top terminal, step 910 is performed, wherein the duplicate set of pointers is placed onto the replacement set-top terminal. Here, step 910 may be implemented via, for example, a local storage manager module on the replacement set-top terminal in network communication with the remote storage manager application 425. In this manner, the replacement set-top terminal is provisioned with the pointers of the original set-top terminal 200. Now having access to these duplicate pointers, the user is thereby able to play back most of, if not all of, the content that was available to the user before the set-top terminal 200 was replaced. The recovery of content when replacing a set-top terminal is thereby relatively seamless from the perspective of the user.

In the process 600 described above, a portion of content is received by the remote storage server 110 and stored on server content storage system 440 under control of the remote storage manager application 425. In one or more embodiments of the invention, such portions of content may originate in a consumer's set-top terminal such as the set-top terminal 200. That is, a given portion of content may first be recorded by a consumer's set-top terminal 200 and then uploaded to the remote storage server 110, where it is ultimately stored. Such a process has an advantage of relieving the remote storage server 110 of the need to record a large amount of content at any given time, instead leveraging a distributed network of consumer equipment to aid in the recording task. Once content is stored on a consumer set-top terminal 200, it may be uploaded to the remote storage server 110 at any practical time thereafter.

While the above-described embodiments are directed to digital video recorders, aspects of the invention are more generally applicable to any electronic devices capable of storing and playing back media (hereinafter "local media players"). The term "local media player" as used herein and in the appended claims is therefore to be construed broadly and would encompass, but not be limited to, personal computers, laptop computers, tablet computers, "smart" cellular telephones, portable music players, e-book readers, personal digital assistants, game consoles, and the like. That is, in accordance with aspects of the invention, a local media player in network communication with a remote storage system may store a portion of content. The portion of content is then compared with content stored on the remote storage system to determine if the portion of content is duplicated on the remote storage system. If the portion of content is duplicated on the remote storage system, the portion of content stored on the local media player is replaced with a pointer to the duplicate portion of content on the remote storage system. During play back of the portion of content on the local media player, the portion of content is played back at least in part by receiving the duplicate portion of content from the remote storage system if the portion of content has been replaced by a pointer. If the portion of content was not replaced by a pointer, play back occurs by simply accessing the portion of content on the local media player.

Figure 10:
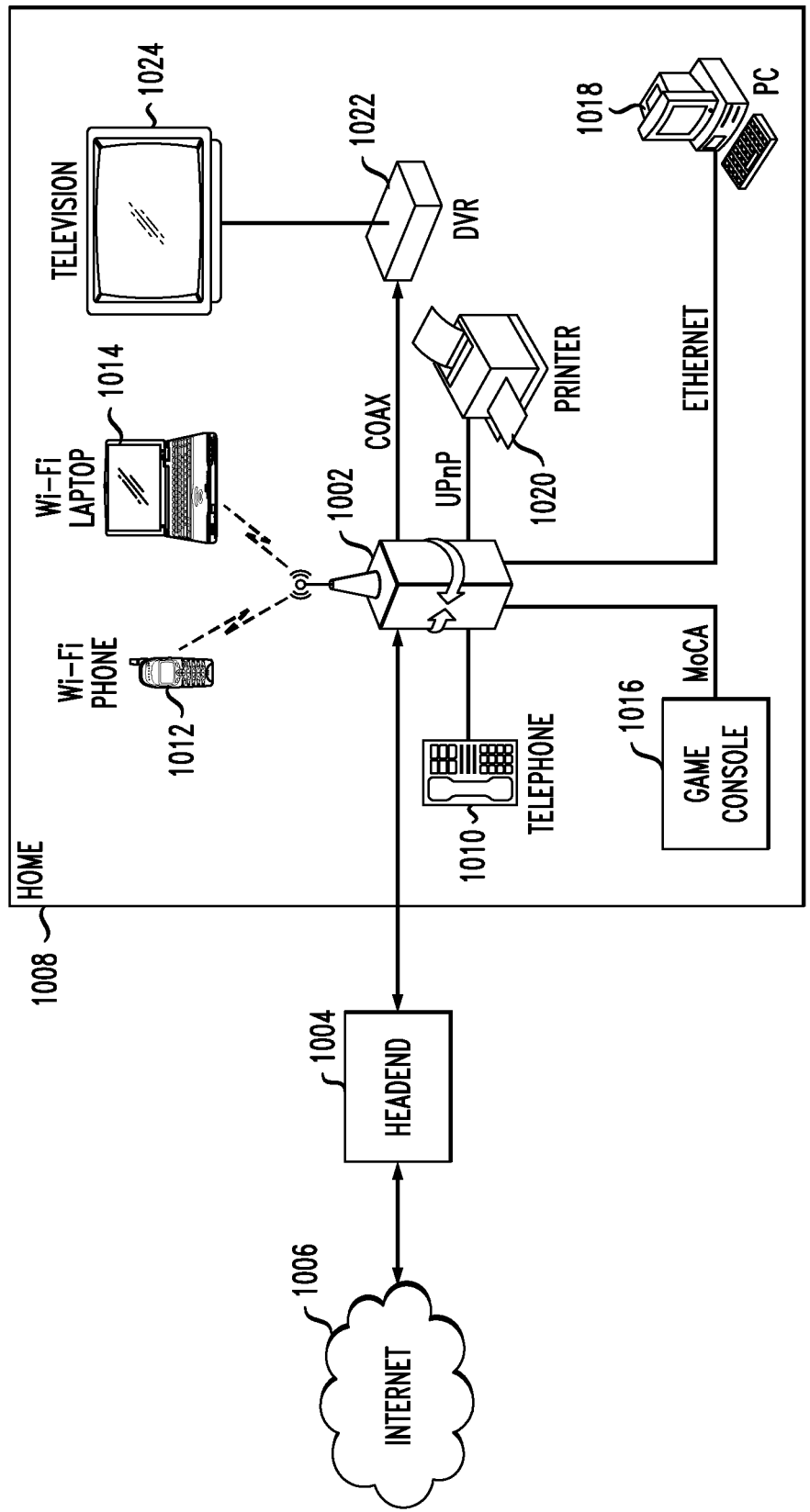
FIG. 10 shows a block diagram of at least a portion of an exemplary home containing several alternative local media players falling within the scope of the invention.

FIG. 10 shows a block diagram of a home network interfacing with a head end of an MSO or the like, providing Internet access. An exemplary wired/wireless modem/router (hereinafter just "router" 1002) connects to a head end 1004 or other hub of a network, such as a video content network of an MSO or the like. The head end 1004 is coupled also to an internet (e.g., the Internet) 1006 which is located external to the head end 1004, such as via an Internet (IP) backbone or gateway (not shown).

The head end 1004 is, in the illustrated embodiment, coupled to multiple households or other premises, including an exemplary illustrative home 1008. In particular, the head end 1004 (for example, a cable modem termination system thereof) is coupled via the aforementioned HFC network and local coaxial cable or fiber drop to the premises, including the router 1002. The exemplary router 1002 is in signal communication with any number of different devices including, e.g., a wired telephony unit 1010, a Wi-Fi or other wireless-enabled phone 1012, a Wi-Fi or other wireless-enabled laptop 1014, a game console 1016, a personal computer (PC) 1018, and a printer 1020. Additionally, the router 1002 is also coupled to a digital video recorder (DVR) 1022 (e.g., over coax), in turn coupled to television 1024 via a wired or wireless interface (e.g., cabling, PAN or 802.15 UWB micro-net, etc.). As indicated above, in one or more alternative embodiments of the invention, any one of the phone 1012, the laptop 1014, the game console 1018, and the PC 1020 may act as local media players in addition to the DVR 1022.

System and Article of Manufacture Details

The invention can employ hardware or hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein. Appropriate interconnections via bus, network, and the like can also be included.

Figure 11:
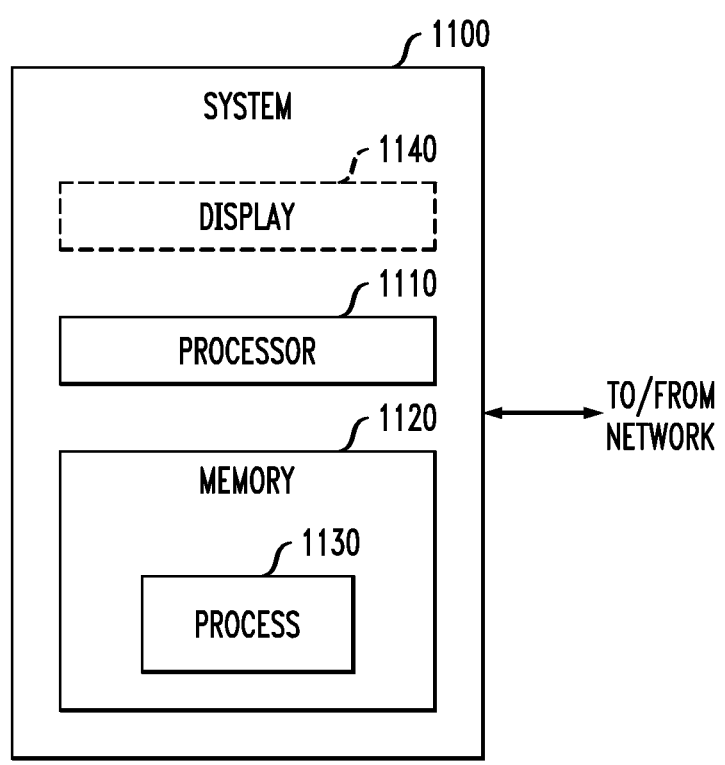
FIG. 11 shows a block diagram of an exemplary system operative to implement at least a portion of one or more aspects of the present invention.

FIG. 11 is a block diagram of a system 1100 that can implement part or all of one or more aspects or processes of the present invention, a processor 1110 of which is representative of processors associated with servers (e.g., remote storage server(s) 110 in FIGS. 1 and 4), clients, set-top terminals 200 of FIG. 2, and other elements with processing capability depicted in the other figures. In one or more embodiments, inventive steps are carried out by one or more of the processors in conjunction with one or more interconnecting network(s).

As shown in FIG. 11, a memory 1120 configures the processor 1110 to implement one or more aspects of the methods, steps, and functions disclosed herein (collectively, shown as process 1130 in FIG. 11). The memory 1120 could be distributed or local and the processor 1110 could be distributed or singular. The memory 1120 could be implemented as an electrical, magnetic or optical memory, or any combination of these or other types of storage devices. It should be noted that if distributed processors are employed, each distributed processor that makes up processor 1110 generally contains its own addressable memory space. It should also be noted that some or all of computer system 1100 can be incorporated into an application-specific or general-use integrated circuit. For example, one or more method steps could be implemented in hardware in an ASIC rather than using firmware. A display 1140 is representative of a variety of possible input/output devices (e.g., mice, keyboards, printers, etc.).

The description of the memory 1120 is also generally applicable to the memories of the terminal 200 of FIG. 2 and remote storage server(s) 110 in FIGS. 1 and 4.

As is known in the art, part or all of one or more aspects of the methods and apparatus discussed herein may be distributed as an article of manufacture that itself includes a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. As used herein, a tangible computer-readable recordable storage medium is intended to encompass a recordable medium which stores instructions and/or data in a non-transitory manner, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, e.g., by processing capability on individual elements in the other figures, or by any combination thereof. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

As used herein, including the claims, a "server" includes a physical data processing system (for example, system 1100 as shown in FIG. 11) running a server program. It will be understood that such a physical server may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. In one or more embodiments, the code is stored in a non-transitory manner.

Non-limiting examples of languages that may be used include markup languages (e.g., hypertext markup language (HTML), extensible markup language (XML), standard generalized markup language (SGML), and the like), C/C++, assembly language, Pascal, Java, EBIF—Extended Binary Interchange Format language, UNIX shell scripts, and the like. Note that EBIF would typically only be employed in connection with a set-top box. RTSP and/or RPC can be employed for interface protocols, for example. Furthermore, non-limiting examples of useful database software include Access® software (registered mark of Microsoft Corporation, Redmond, Wash., USA); Oracle® software (registered mark of Oracle International Corporation, 500 Oracle Parkway, Redwood City, Calif. 94065, USA); Informix® software (registered mark of International Business Machines Corporation, Armonk, N.Y., USA); and structured query language (SQL) software available from many sources, including Microsoft Corporation, Redmond, Wash., USA).

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

System(s) have been described herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors such as digital signal processors (DSPs). A DSP typically comprises a combination of digital logic devices and other components, which may be a state machine or implemented with a dedicated microprocessor or micro-controller running a software program or having functions programmed in firmware.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method to be performed by a local media player in network communication with a remote storage system, the method comprising the steps of:
    storing a portion of content on the local media player;
    comparing the portion of content stored on the local media player with content stored on the remote storage system to determine if the portion of content is duplicated on the remote storage system;
    replacing the portion of content stored on the local media player with a pointer to a duplicate portion of content stored on the remote storage system if the portion of content is duplicated on the remote storage system; and
    playing back the portion of content at least in part by receiving the duplicate portion of content from the remote storage system if the portion of content has been replaced by a pointer, or by accessing the portion of content stored on the local media player if the portion of content has not been replaced by a pointer.

2. The method of claim 1, wherein the step of playing back the portion of content at least in part by receiving the duplicate portion of content from the remote storage system comprises causing the remote storage system to stream the duplicate portion of content to the local media player.

3. The method of claim 1, wherein the replacing step, when performed, frees up storage space on the local media player for additional content storage.

4. The method of claim 1, wherein the comparing step is initiated at least in part by the passage of a predetermined amount of time.

5. The method of claim 1, wherein the comparing step is initiated at least in part by the local media player recording a predetermined amount of content.

6. The method of claim 1, wherein the portion of content comprises at least one of video content, audio content, image content, and text content.

7. The method of claim 1, wherein the local media player comprises a digital video recorder.

8. The method of claim 7, wherein the digital video recorder is implemented in a set-top terminal.

9. The method of claim 1, wherein the remote storage system comprises a server.

10. The method of claim 1, further comprising the step of storing on the remote storage system a duplicate set of pointers that substantially duplicates a set of pointers placed on the local media player.

11. The method of claim 10, further comprising the step of placing the duplicate set of pointers on a second local media player.

12. The method of claim 11, wherein the placing step is performed when replacing the local media player with the second local media player.

13. The method of claim 1, wherein the comparing step comprises identifying the portion of content stored on the local media player.

14. The method of claim 13, wherein the identifying is performed at least in part with reference to a time during which the portion of content was stored on the local media player.

15. The method of claim 13, wherein the identifying is performed at least in part with reference to a channel from which the portion of content was received by the local media player.

16. The method of claim 13, wherein the identifying is performed at least in part with reference to metadata associated with the portion of content.

17. The method of claim 13, wherein the identifying is performed at least in part with reference to a listing schedule.

18. The method of claim 1, wherein the comparing step comprises comparing data constituting the portion of content stored on the local media player with data constituting one or more portions of content stored on the remote storage system.

19. The method of claim 1, wherein the comparing step utilizes one or more data deduplication techniques.

20. The method of claim 1, wherein the step of playing back the portion of content at least in part by receiving the duplicate portion of content from the remote storage system comprises manipulating the pointer.

21. The method of claim 20, wherein the pointer is formatted as a command in conformance with a Hypertext Transfer Protocol.

22. The method of claim 20, wherein manipulating the pointer comprises utilizing the pointer as a parameter in a subroutine call.

23. The method of claim 1, wherein the local media player comprises distinct software modules, each of the distinct software modules being embodied on a non-transitory computer-readable storage medium, wherein the distinct software modules comprise a local storage manager module, a content comparison module, and a local recording manager module, and wherein:
    the storing and replacing steps are carried out by the local storage manager module executing on at least one hardware processor;
    the comparing step is carried out by the content comparison module executing on the at least one hardware processor; and
    the playing back step is carried out by the local recording manager module executing on the at least one hardware processor.

24. A computer program product comprising a tangible, non-transitory computer readable storage medium having computer readable program code embodied therewith, the computer readable program code comprising computer readable program code configured to:

store a portion of content on a local media player;

compare the portion of content stored on the local media player with content stored on a remote storage system to determine if the portion of content is duplicated on the remote storage system;

replace the portion of content stored on the local media player with a pointer to a duplicate portion of content stored on the remote storage system if the portion of content is duplicated on the remote storage system; and play back the portion of content at least in part by receiving the duplicate portion of content from the remote storage system if the portion of content has been replaced by a pointer, or by accessing the portion of content stored on the local media player if the portion of content has not been replaced by a pointer.

25. A local media player in network communication with a remote storage system, the local media player comprising:

a memory; and at least one processor, coupled to the memory, and operative to:

store a portion of content on the local media player;

compare the portion of content stored on the local media player with content stored on the remote storage system to determine if the portion of content is duplicated on the remote storage system;

replace the portion of content stored on the local media player with a pointer to a duplicate portion of content stored on the remote storage system if the portion of content is duplicated on the remote storage system; and play back the portion of content at least in part by receiving the duplicate portion of content from the remote storage system if the portion of content has been replaced by a pointer, or by accessing the portion of content stored on the local media player if the portion of content has not been replaced by a pointer.

26. A local media player in network communication with a remote storage system, the local media player comprising:

means for storing a portion of content on the local media player;

means for comparing the portion of content stored on the local media player with content stored on the remote storage system to determine if the portion of content is duplicated on the remote storage system;

means for replacing the portion of content stored on the local media player with a pointer to a duplicate portion of content stored on the remote storage system if the portion of content is duplicated on the remote storage system; and means for playing back the portion of content at least in part by receiving the duplicate portion of content from the remote storage system if the portion of content has been replaced by a pointer, or by accessing the portion of content stored on the local media player if the portion of content has not been replaced by a pointer.

27. A system comprising a local media player in network communication with a remote storage system, the local media player operative to perform the steps of:

storing a portion of content on the local media player;

comparing the portion of content stored on the local media player with content stored on the remote storage system to determine if the portion of content is duplicated on the remote storage system;

replacing the portion of content stored on the local media player with a pointer to a duplicate portion of content stored on the remote storage system if the portion of content is duplicated on the remote storage system; and playing back the portion of content at least in part by receiving the duplicate portion of content from the remote storage system if the portion of content has been replaced by a pointer, or by accessing the portion of content stored on the local media player if the portion of content has not been replaced by a pointer.

* * * * *